United States Patent
Zimmer et al.

(10) Patent No.: US 9,050,946 B2
(45) Date of Patent: Jun. 9, 2015

(54) METHOD FOR REDUCING MOTOR TORQUE FOR WIPER DRIVES

(75) Inventors: Joachim Zimmer, Shanghai (CN); Juergen Rapp, Lauf (DE); Swen Koehn, Karlsruhe (DE)

(73) Assignee: Robert Bosch GmbH, Stuttgart (DE)

(*) Notice: Subject to any disclaimer, the term of this patent is extended or adjusted under 35 U.S.C. 154(b) by 206 days.

(21) Appl. No.: 13/820,178

(22) PCT Filed: Jul. 29, 2011

(86) PCT No.: PCT/EP2011/063107
§ 371 (c)(1),
(2), (4) Date: Mar. 1, 2013

(87) PCT Pub. No.: WO2012/028405
PCT Pub. Date: Mar. 8, 2012

(65) Prior Publication Data
US 2013/0162180 A1    Jun. 27, 2013

(30) Foreign Application Priority Data

Sep. 2, 2010  (DE) .......................... 10 2010 040 138

(51) Int. Cl.
G05B 5/00        (2006.01)
B60S 1/08        (2006.01)

(52) U.S. Cl.
CPC . *B60S 1/08* (2013.01); *B60S 1/0859* (2013.01)

(58) Field of Classification Search
USPC ................. 318/520, 560, 625, 286, 127, 799, 318/400.12; 209/203
See application file for complete search history.

(56) References Cited

U.S. PATENT DOCUMENTS 6,281,649 B1 * 8/2001 Ouellette et al. .............. 318/443
6,657,410 B1   12/2003 Berger et al.
(Continued)

FOREIGN PATENT DOCUMENTS

| JP | 62198549 | 9/1987 |
| JP | 6452558 | 2/1989 |
| WO | 2009/138345 A1 | 11/2009 |

(Continued)

OTHER PUBLICATIONS

International Search Report for Application No. PCT/EP2011/063107 dated Oct. 27, 2011 (English Translation and Original, 4 pages).

*Primary Examiner* — Kawing Chan
*Assistant Examiner* — Jorge L Carrasquillo
(74) *Attorney, Agent, or Firm* — Michael Best & Friedrich LLP

(57) ABSTRACT

The invention relates to a method for operating a direct wiper drive having a motor, in particular for a windshield wiper. The method comprises reading out at least one characteristic curve from a memory and operating the wiper direct drive at an angle- and direction-dependent torque, corresponding at a maximum to a value of the angle- and direction-dependent characteristic curve, wherein the characteristic curve comprises at least the following values: a first, maximum value for upward wiping at a first wiping angle between a lower turning location and an upper turning location; a second value for upward wiping at a second wiping angle between the first wiping angle and the upper turning location, wherein the second value for upward wiping at the second wiping angle is less than the first, maximum value for upward wiping at the first wiping angle; a first, maximum value for downward wiping at a wiping angle between the upper turning location and the lower turning location, wherein the first, maximum value for downward wiping is greater than the first, maximum value for upward wiping; and a second value for downward wiping corresponding to a wiper position at the second wiping angle, wherein the second value for downward wiping is greater than the second value for upward wiping.

9 Claims, 2 Drawing Sheets

(56) References Cited

U.S. PATENT DOCUMENTS

| | | |
|---|---|---|
| 7,166,979 B2 | 1/2007 | Zimmer |
| 2004/0145331 A1* | 7/2004 | Gloaguen et al. ............. 318/443 |
| 2012/0227205 A1* | 9/2012 | Maier et al. ................ 15/250.12 |
| 2013/0119911 A1* | 5/2013 | Karcher ........................ 318/465 |

FOREIGN PATENT DOCUMENTS

WO    WO 2009138345 A1 * 11/2009

* cited by examiner

METHOD FOR REDUCING MOTOR TORQUE FOR WIPER DRIVES

BACKGROUND OF THE INVENTION

The invention relates to a method for operating a wiper drive having a motor, a computer program product comprising a program code, which is stored on a machine-readable carrier, and a control device for a wiper drive. The invention particularly relates in this case to the load characteristic of the motor torque during the wiping operation.

Numerous methods for controlling wiper drives (WSA) are known. For example, The German patent specification DE 101 44 985 describes a drive, which drives a wiper by means of a wiper shaft and a torque dependent on the position of the transmission. A control is used here such that the torque delivered by a motor is ascertained at any moment while taking the transmission ratio into consideration.

In wiper drives, the components are subjected to loading by forces. Said forces then increase in wiper drives, as said drives are, for example, used in motor vehicles for operating windshield wipers, in the case of snow load, wind load or when the wiper is blocked. Especially in the latter case of blockage, in particular when the systems are frozen, very large loads can occur, which damage or destroy the wiper system. This can lead to the wiper system breaking down as a result of component failure.

Drives comprising reversing electric motors, in which the motor changes rotational direction in order to generate the reciprocating motion of the wiper, are typically used in wiper systems having direct wiper drives. The wiper blade thereby changes the direction of motion thereof at a lower or respectively upper turning location. The use of reversing motors of this kind further allows for an extended park position (EPS), i.e. a park position below the lower turning location. When switched off, the wiper can thus be parked in a very low position, which is not reached by the wiper system during normal operation.

As a protective function against damage or destruction, a reduced voltage and consequently a reduced motor torque for reducing load can be delivered to an electric motor contained in a wiper drive by means of pulse width modulation (PWM). During operations, the wiper motor can thereby be reduced in the torque thereof in critical ranges. This has, however, a limit due to a reducible voltage value for the drive unit, wherein the voltage cannot be arbitrarily reduced. In simple systems, the speed of the drive and thus the speed of the wiper can furthermore be reduced in the region of the turning locations. The characteristic curve for the pulse width modulation for the wiping operation is laid out during normal operation such that the wiper system can fully traverse the range thereof and remain operable even at high wind speeds. The minimum required rotational speed of the wiper system, which is prescribed by law and according to which a predefined rotational speed may not be undershot in the lowest stage of said wiper system, is particularly to be taken into account in this instance. In the event of the wiper system being blocked, a sufficient level of sensitivity should however be provided to protect the system. The statutory regulations conflict however with the basic idea of the protective function for blocking the system because the required rotational speeds can possibly no longer be provided when a corresponding reduction in motor torque occurs.

SUMMARY OF THE INVENTION

The aim of the invention consists of at least partially solving the problems mentioned above or more specifically of building the components of a direct wiper drive in a simple manner and of providing an improved torque control.

According to one embodiment, a method for operating a wiper drive having a motor, in particular for a windshield wiper, is provided. The method comprises reading out at least one characteristic curve from a memory and operating the wiper direct drive at an angle- and direction-dependent torque corresponding at a maximum to a value of the angle- and direction-dependent characteristic curve, wherein the characteristic curve comprises at least the following values: a first, maximum value for upward wiping at a first wiping angle between a lower turning location and an upper turning location; a second value for upward wiping at a second wiping angle between the first wiping angle and the upper turning location, wherein the second value for upward wiping at the second wiping angle is less than the first, maximum value for upward wiping at the first wiping angle; a first, maximum value for downward wiping at a wiping angle between the upper turning location and the lower turning location, wherein the first, maximum value for downward is greater than the first maximum value for upward wiping; and a second value for downward wiping corresponding to a wiper position at the second wiping angle, wherein the second value for downward wiping is greater than the second value for upward wiping.

According to a further embodiment, a method for calculating at least one characteristic curve for use in a method for operating a wiper system is provided. The method comprises acquiring an air resistance of a wiper blade and a wiper arm as an angle- and direction-dependent first function, acquiring the inertia of the motor, the wiper blade and/or the wiper arm as an angle- and direction-dependent second function, acquiring frictional forces of the wiper blade on the window pane and frictional forces of a bearing as the an angle- and direction-dependent third function, and calculating the at least one characteristic curve as a function of the first, the second and the third function.

According to a further embodiment, a computer program product comprising a program code, which is stored on a machine-readable carrier, is provided. The computer program product is equipped for carrying out one of the inventive embodiments of the method described herein if the program is executed on a computer or in a control device of a motor vehicle.

According to yet a further embodiment, a control device for a wiper drive is provided, which is programmed for use in a method according to embodiments described herein.

Advantages of the Invention

The embodiments described here in accordance with the present invention can provide a load dependent torque control for a direct wiper drive. The load torques of a direct wiper drive can typically be determined under different operating conditions, i.e. on the window pane of a motor vehicle; and an angle-dependent or angle- and direction-dependent open-loop and/or closed-loop control can be defined with respect to the torque.

For this reason, embodiments of the invention provide a case-by-case distinction between different load conditions. Generally one or a plurality of characteristic curves is viewed as a function of different wiper angles and/or wiper directions. Because a motor crank angle between 0° and 180° or 0° and 360° is not necessarily used with direct wiper drives, a transformed wiper angle of 0° to 180° or 0° to 360°, which already takes into account a wiping direction within the limits of the angle, can on the one hand be used. It is however also possible to look at the wiping at different wiping angles and for different wiping directions so that an angle correlates to a wiping position in a direction of motion and the same wiping position is in turn assumed in the respective other direction. In this regard, a case-by-case distinction can typically occur in a region between a park position and a lower turning location in the upward wiping direction, in a region between a lower turning location and an upper turning location in the upward wiping direction, in a region near the upper turning location (a region of up to approximately 5° to 20° away from the upper turning location), in a region of the upper turning location in the downward wiping direction (a region of up to 5° to 20° away from the upper turning location), in a region between the upper turning location and the lower turning location in the downward wiping direction and in a region between the lower turning location and the park position in the downward wiping direction.

According to one embodiment of the invention, a characteristic curve has thereby at least the following values: a first, maximum value for upward wiping at a first wiping angle between a lower turning location and an upper turning location; a second value for upward wiping at a second wiping angle between the first wiping angle and the upper turning location, wherein the second value for upward wiping at the second wiping angle is less than the first, maximum angle for upward wiping at the first wiping angle; a first, maximum value for downward wiping at a wiping angle between the upper turning location and the lower turning location, wherein the first, maximum value for downward wiping is greater than the first, maximum value for upward wiping; and a second value for downward wiping corresponding to a wiper position at the second wiping angle, wherein the second value for downward wiping is greater than the second value for upward wiping.

According to a further typical embodiment, at least 90% of the values of the characteristic curve for upward wiping at additional wiping angles between the first wiping angle and the upper turning location are less than the corresponding values for downward wiping at wiper positions corresponding to the additional wiping angles. In so doing, a wind load which increases during downward wiping can be taken into account.

According to a further typical embodiment, at least 90% of the values of the characteristic curve at additional park wiping angles between an extended park position and the lower turning location for upward wiping are greater than the corresponding values for downward wiping at wiper positions corresponding to the additional park wiping angles. An increased risk of destruction or damage by chunks of snow or something similar can thereby be taken into account.

According to further typical preferred embodiments, the characteristic curve relates to a torque characteristic curve as a function of the wiping angle or a pulse width modulation characteristic curve as a function of the wiping angle.

According to further typical preferred embodiments, the at least one characteristic curve is a characteristic curve from a family of characteristic curves. A load dependent control of the torque can thereby be provided for different operating states, different operating conditions and/or different types of motor vehicles. For example, the family of characteristic curves can be a plurality of characteristic curves for a plurality of weather conditions, a plurality of characteristic curves for a plurality of types of motor vehicles and/or a plurality of characteristic curves for a plurality of speed ranges.

According to a further embodiment, a method for calculating at least one characteristic curve can comprise the following steps: acquiring an air resistance of a wiper blade and a wiper arm as an angle- and direction-dependent first function; acquiring the inertia of the motor, the wiper blade and/or the wiper arm as an angle- and direction-dependent second function; acquiring the frictional forces of the wiper blade on the window pane and the frictional forces of a bearing as the angle- and direction-dependent third function and calculating the at least one characteristic curve as a function of the first, the second and the third function.

According to further embodiments, computer program products comprising a program code, which is stored on a machine-readable carrier, are provided for carrying out the methods described here according to the embodiments of the invention, wherein the methods are implemented if the program is executed on a computer or in a control unit of a motor vehicle.

In addition, embodiments focus on a windshield wiper device comprising a control device or a computer program product according to embodiments of the invention and comprising a direct wiper drive having a motor, a wiper arm and a wiper blade, wherein at least the characteristic curve and a predetermined breaking point of the wiper arm are calibrated to one another. Wiper systems of lightweight construction or with predetermined breaking points can thus be calibrated to one another. By reducing the loads, thinner wall thicknesses and materials, as, e.g., plastics with lower strength, can be used. In so doing, installation space and costs can be saved. Furthermore, the material use, the weight of the wiper device or respectively the drive device and the strength requirements of components and assemblies can be reduced. The angle- and direction-dependent torque control can therefore be conducive to a lightweight construction.

BRIEF DESCRIPTION OF THE DRAWINGS

Exemplary embodiments of the invention are depicted in the figures and are described in detail below. In the drawings.

DETAILED DESCRIPTION

Figure 1:
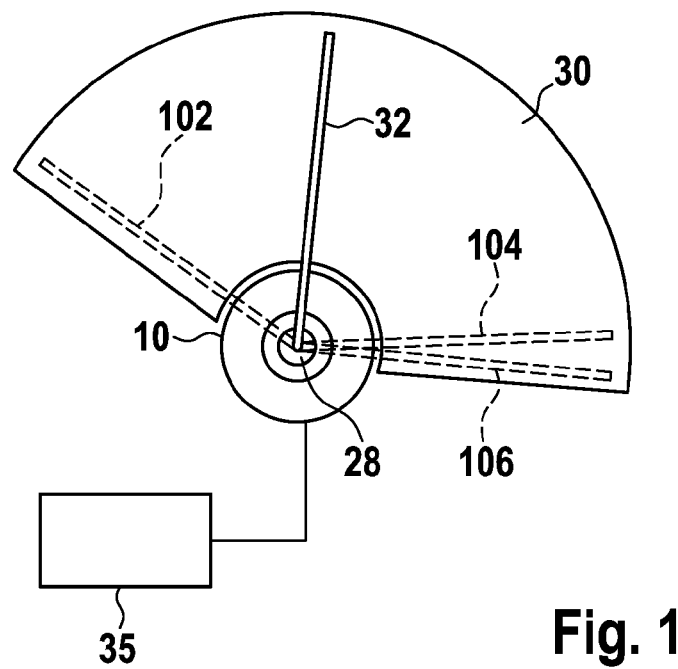
FIG. 1 shows a schematic depiction of a wiper drive, a windshield wiper, the control and monitoring elements as well as the wiper positions typical for the operation.

FIG. 1 shows a schematic depiction of a configuration of a wiper drive. A motor 10 brings about a rotational movement of the wiper lever 32 at the bearing 28. FIG. 1 shows the wiper lever 32 in an arbitrary position on the window pane 30. The upper turning location 102, the lower turning location 104 and the extended park position 106 are depicted by the dashed lines. By means of reversing rotation of the motor 10, the wiper lever 32 is reciprocated in the normal operation between the upper turning location 102 and the lower turning location 104. If the wiper is not needed or not used during the operation of the vehicle, i.e. when a user switches off the wiper drive, the wiper lever 32 moves from the lower turning location 104 to the extended park position 106. The extended park position 106 is typically located at a very low position on the window pane, e.g. entirely or partially in the slipstream of a corresponding accentuation of an engine hood of the vehicle.

According to typical embodiments, a very low parking of the wiper lever 32 in relation to the window pane 30 can thereby be implemented. For example, the extended park position can correspond to a rotation of 2° to 3° below the lower turning location.

As depicted in FIG. 1, the motor is typically controlled by a control device 30, and the motor detects the position thereof, e.g. a rotation about the axis 28, by means of a sensor, as, for example, a magnetic sensor.

Figure 2:
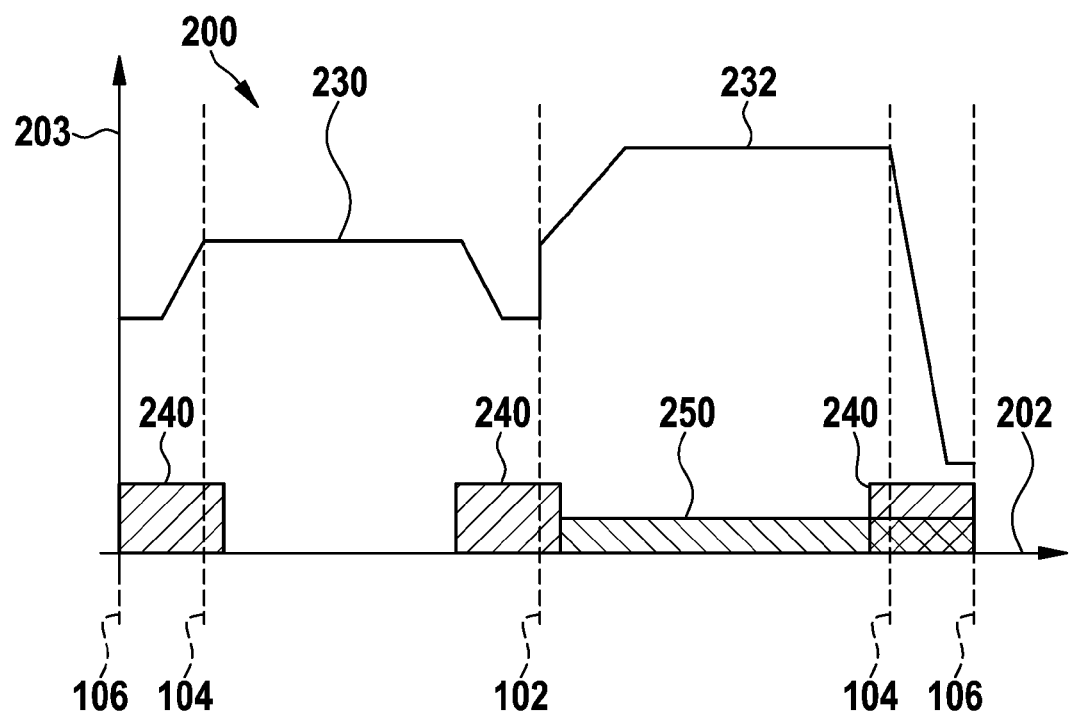
FIG. 2 shows a schematic depiction of characteristic curves for a wiper drive according to embodiments of the present invention.

In the embodiments of the present invention, a load-dependent torque control is provided during the wiping operation, in particular for a direct wiper drive. FIG. 2 illustrates a characteristic curve as a function of the wiping angle. The motor shaft positions analogous to FIG. 1 are delineated here. This also relates to motor crank positions in accordance with typical, preferred embodiments. The motor crank angle 102 corresponds to the upper turning location. The motor crank angle 104 corresponds to the lower turning location. The motor crank angle 106 corresponds to the extended park position. A characteristic curve 200 is depicted here by way of example for a pulse width modulation or a voltage 203. Said characteristic curve yields a torque at the motor, which is transferred within the framework of a direct drive without gearing by a linkage to the drive shaft of the wiper. This means that for each wiping angle position approximately the same torque, which is provided by the motor, is applied to the wiper lever. As an alternative, a fixed transmission ratio for each wiping angle can, however, also be implemented.

FIG. 2 further shows ranges 240 and 250. Range 240 corresponds to wiping angle ranges, in which chunks of snow can form on the window pane under certain weather conditions. Snow chunks can lead to the blockage of the wiper device and thus to high forces. The range 250 designates the range of the downward wiping, which is characterized by increased forces on account of the air resistance of the wiper arm and the wiper blade.

In the embodiments of the present invention, a load-dependent torque control is provided. The torque is controlled as a function of the wiping angle or as the case may be as a function of the wiping angle and the wiping direction. In so doing, an individual control for each wiping angle or if applicable each position of the wiper and each direction of wiping can be provided as a function of the operating conditions. The load torques are determined under different operating conditions. This can, for example, occur on the window pane of a motor vehicle, in particular on the window pane of a specific motor vehicle. An angle-dependent or if applicable an angle- and direction-dependent open-loop or closed-loop control can be predefined with respect to the torque. Load torques thereby depend particularly on the air resistance of the wiper blades and wiper arms, in particular at high vehicle speeds (cw value); on the inertia of the accelerated masses, in particular rotating and reversing masses in the motor and the masses of the wiper lever to be accelerated; and/or on frictional values, in particular of the wiper blade on the window pane and of bearing components in the drive. According to a further modification, these influences can be acquired as a function of the vehicle type, as a function of operating conditions such as vehicle speed and weather and/or as a function of the positioning of the wiper lever. For example, the increased air resistance at increased speed can be taken into account here. As a further example, a characteristic curve for a right and left wiper of a windshield can lead to different load torques, which can be ascertained within the framework of a use of different characteristic curves.

According to typical embodiments, a calculation of a characteristic curve or a family of characteristic curves can therefore take place. In so doing, an air resistance of a wiper blade and a wiper arm can be acquired as an angle- and direction-dependent first function, the inertia of the motor, the wiper blade and/or the wiper arm as an angle- and direction-dependent second function and/or the frictional forces of the wiper blade on the window pane and the frictional forces of a bearing as an angle- and direction-dependent third function. These functions then serve to calculate the at least one characteristic curve as a function of the first, second or third function.

FIG. 2 shows a characteristic curve 200 comprising different regions, wherein the torque is separately defined region by region or for each angle (and direction). The regions 230 and 232 differentiate here, for example, the upward wiping 230 from the downward wiping 232. The downward wiping requires an increased torque due to the increased air resistance. In the regions, which correspond to the formation of chunks of snow, the torque is reduced in order to prevent damage to or the destruction of the wiper device. As can be seen in FIG. 2, the load-dependent characteristic curve is, however, likewise defined with an increased torque in the region of the upper turning location 102 during downward wiping. The torque during downward wiping in comparison to corresponding wiping positions during upward wiping is reduced only in the region between the lower turning location and the park position.

A direct wiper drive is a more rigid system in comparison to a wiping device comprising linkage. An elastic behavior of the total system, which comprises weak spots with respect to blocking rigidity and service strength, is however also evident here. In addition, cast plates, which, e.g., are optimized for lightweight construction or are provided with predetermined breaking points required for pedestrian impact protection, and motor retaining plates, to which the motor is mounted, display a different behavior depending upon the load. In the case of a blockage, the loads on the components can, for example, vary significantly depending on wiping direction and wiping angle.

According to embodiments of the invention having a load-dependent torque control, the components can be of lighter construction, i.e. for example having thinner wall thicknesses or comprising lighter materials. This can lead to a further reduction in material use and a reduction to the face of the drive device. Wiper systems can be provided in a lighter and more cost-saving manner (respectively requiring less installation space while adequately protecting the total system) by means of the angle- and direction-dependent control, which, e.g., specifies at least one voltage value or PWM value for each 5° of wiping angle or at least one voltage value or PWM value for each 1° of wiping angle, in each case in both wiping directions, and by means of establishing a correlation between the torque control and the weak spots or predetermined breaking points of the wiper drive, the wiper levers and/or the wiper blades. The torque can therefore be controlled by an angle- and direction-dependent characteristic curve, which corresponds to a maximum torque, such that only the required torque is delivered at any point in time and such that in the case of a blockage, the wiping angle and the wiping direction for each position, i.e. continuously or semi-continuously in small ranges (smaller than 10°, preferably smaller than 5° or smaller than 1°, are taken into account for the load.

According to typical embodiments, such a control can be integrated into a software and/or a control device.

Figure 3:
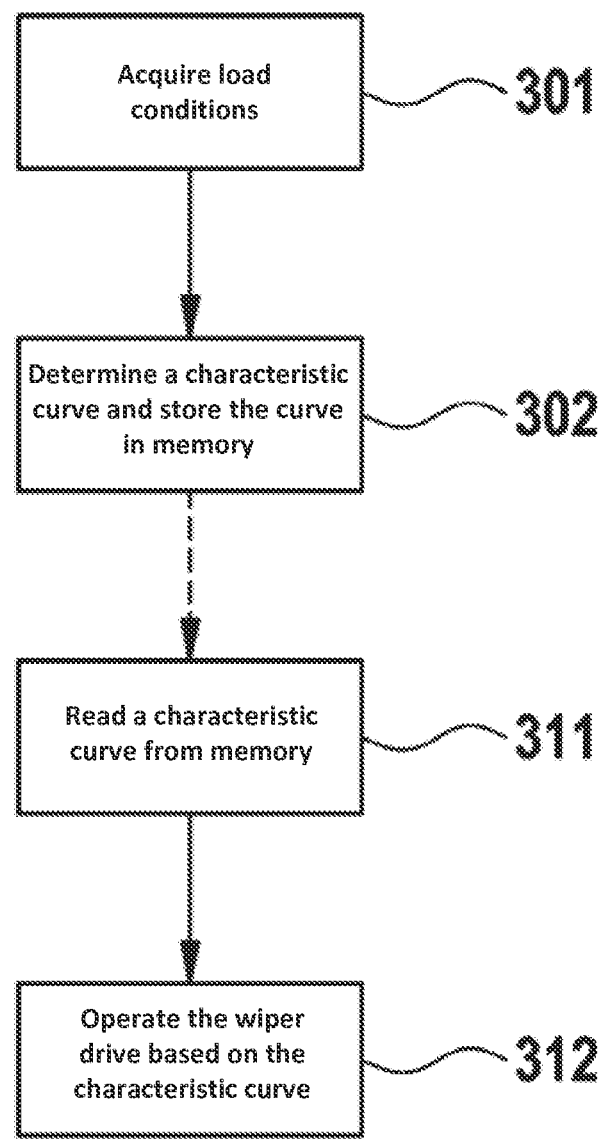
FIG. 3 shows a flow chart of a method for operating a wiper drive according to embodiments of the present invention.

A corresponding method according to the embodiment of the present invention is depicted in FIG. 3 using a flow chart. In step 301, at least a load is acquired. Loads such as air resistance, friction and inertia can typically be acquired separately from one another or can be alternatively acquired as a total load. In this case, the term "acquire" refers to both a measuring of load conditions and a calculation of loads, e.g. by means of model calculations. In step 302, a characteristic curve or a family of characteristic curves is calculated from the one or the plurality of acquired load functions. The characteristic curve can be deposited in the memory of a motor vehicle. In step 311 which can be considered as the beginning of a method independent of steps 301 and 302, this fact being indicated by the dashed arrow, at least one characteristic curve is read from the memory. The at least one characteristic curve is used in step 312 to operate the wiper drive. For the purpose of providing favorable operating conditions, a torque which, e.g., is below the curve depicted as the characteristic curve in FIG. 2, is generally used here. For larger load conditions, such as, e.g., a blockage, the value can increase for the corresponding wiping angle or respectively for the corresponding wiping position and the corresponding wiping direction up to a maximum of the values specified by the characteristic curve.

The invention claimed is:

1. A method for operating a direct wiper drive having a motor, the method comprising:
    reading out at least one characteristic curve from a memory and operating the wiper direct drive at an angle- and direction-dependent torque, corresponding at a maximum to a value of the angle- and direction-dependent characteristic curve, wherein the characteristic curve includes at least the following values:
        a first, maximum value for upward wiping at a first wiping angle between a lower turning location and an upper turning location;
        a second value for upward wiping at a second wiping angle between the first wiping angle and the upper turning location, wherein the second value for upward wiping at the second wiping angle is less than the first, maximum value for upward wiping at the first wiping angle;
        a first, maximum value for downward wiping at a wiping angle between the upper turning location and the lower turning location, wherein the first, maximum value for downward wiping is greater than the first, maximum value for upward wiping; and
        a second value for downward wiping corresponding to a wiper position at the second wiping angle, wherein the second value for downward wiping is greater than the second value for upward wiping;
    wherein the at least one characteristic curve is determined based on:
        acquiring an air resistance of a wiper blade and a wiper arm as an angle- and direction-dependent first function,
        acquiring the inertia of the motor, the wiper blade and/or the wiper arm as an angle- and direction-dependent second function,
        acquiring frictional forces of the wiper blade on the window pane and frictional forces of a bearing as an angle- and direction-dependent third function, and
        calculating the at least one characteristic curve as a function of the first, the second and the third function.

2. The method according to claim 1, wherein the characteristic curve correlates with a pulse width modulation as a function of the wiping angle.

3. The method according to claim 1, wherein the at least one characteristic curve is a characteristic curve from a family of characteristic curves.

4. The method according to claim 3, wherein the family of characteristic curves is a plurality of characteristic curves for a plurality of weather conditions, a plurality of characteristic curves for a plurality of vehicle types and/or a plurality of characteristic curves for a plurality of speed ranges.

5. A non-transitory, computer-readable medium comprising instructions that, when executed by a processor, carry out the method according to claim 1.

6. A control device for a direct wiper drive, which is programmed to carry out the method according to claim 1.

7. A windshield wiper device, comprising:
    a device for carrying out the method according to claim 1; and
    a direct wiper drive having a motor, a wiper arm and a wiper blade, wherein the at least one characteristic curve and a predetermined breaking point of the wiper arm are calibrated to one another.

8. A method for operating a direct wiper drive having a motor, the method comprising:
    reading out at least one characteristic curve from a memory and operating the wiper direct drive at an angle- and direction-dependent torque, corresponding at a maximum to a value of the angle- and direction-dependent characteristic curve, wherein the characteristic curve includes at least the following values:
        a first, maximum value for upward wiping at a first wiping angle between a lower turning location and an upper turning location;
        a second value for upward wiping at a second wiping angle between the first wiping angle and the upper turning location, wherein the second value for upward wiping at the second wiping angle is less than the first, maximum value for upward wiping at the first wiping angle;
        a first, maximum value for downward wiping at a wiping angle between the upper turning location and the lower turning location, wherein the first, maximum value for downward wiping is greater than the first, maximum value for upward wiping; and
        a second value for downward wiping corresponding to a wiper position at the second wiping angle, wherein the second value for downward wiping is greater than the second value for upward wiping,
    wherein at least 90% of the values of the characteristic curve during upward wiping at additional wiping angles between the first wiping angle and the upper turning location are less than the corresponding values for downward wiping at wiper positions corresponding to the additional wiper angles.

9. A method for operating a direct wiper drive having a motor, the method comprising:
    reading out at least one characteristic curve from a memory and operating the wiper direct drive at an angle- and direction-dependent torque, corresponding at a maximum to a value of the angle- and direction-dependent characteristic curve, wherein the characteristic curve includes at least the following values:
        a first, maximum value for upward wiping at a first wiping angle between a lower turning location and an upper turning location;
        a second value for upward wiping at a second wiping angle between the first wiping angle and the upper turning location, wherein the second value for upward wiping at the second wiping angle is less than the first, maximum value for upward wiping at the first wiping angle;

a first, maximum value for downward wiping at a wiping angle between the upper turning location and the lower turning location, wherein the first, maximum value for downward wiping is greater than the first, maximum value for upward wiping; and a second value for downward wiping corresponding to a wiper position at the second wiping angle, wherein the second value for downward wiping is greater than the second value for upward wiping, wherein at least 90% of the values of the characteristic curve at additional park wiping angles between an extended park position and the lower turning location during upward wiping are greater than the corresponding values for downward wiping at wiper positions corresponding to the additional park wiping angles.

* * * * *